United States Patent [19]
Novak

[11] 3,819,904
[45] June 25, 1974

[54] CONTROL CIRCUIT FOR TIMED FOOD HEATING DEVICE

[75] Inventor: Edward P. Novak, North Canton, Ohio

[73] Assignee: The Hoover Company, North Canton, Ohio

[22] Filed: Mar. 16, 1973

[21] Appl. No.: 342,091

[52] U.S. Cl.................... 219/492, 337/54, 337/103
[51] Int. Cl. ............................................. H05b 1/02
[58] Field of Search................... 219/490, 492, 334; 337/102, 103, 104, 51, 100, 107; 99/327, 332

[56] References Cited
UNITED STATES PATENTS
2,778,902  1/1957  Visos .................................... 337/51
3,378,658  4/1968  Arlin et al. ............................ 337/54

FOREIGN PATENTS OR APPLICATIONS
933,472  9/1955  Germany .............................. 337/51

Primary Examiner—J. D. Miller
Assistant Examiner—Fred E. Bell

[57] ABSTRACT

Control circuit for a timed food heating device such as an electric toaster having a heat-up, cool-down timer. The invention provides for selectively operating the device in a (1) normal, high-heat output mode for an operational cycle, in a (2) lower heat output mode for a somewhat longer operational cycle, or in a (3) low heat output mode during the initial portion of the operational cycle and a high heat output mode during the latter portion of such operational cycle.

9 Claims, 1 Drawing Figure

PATENTED JUN 25 1974  3,819,904
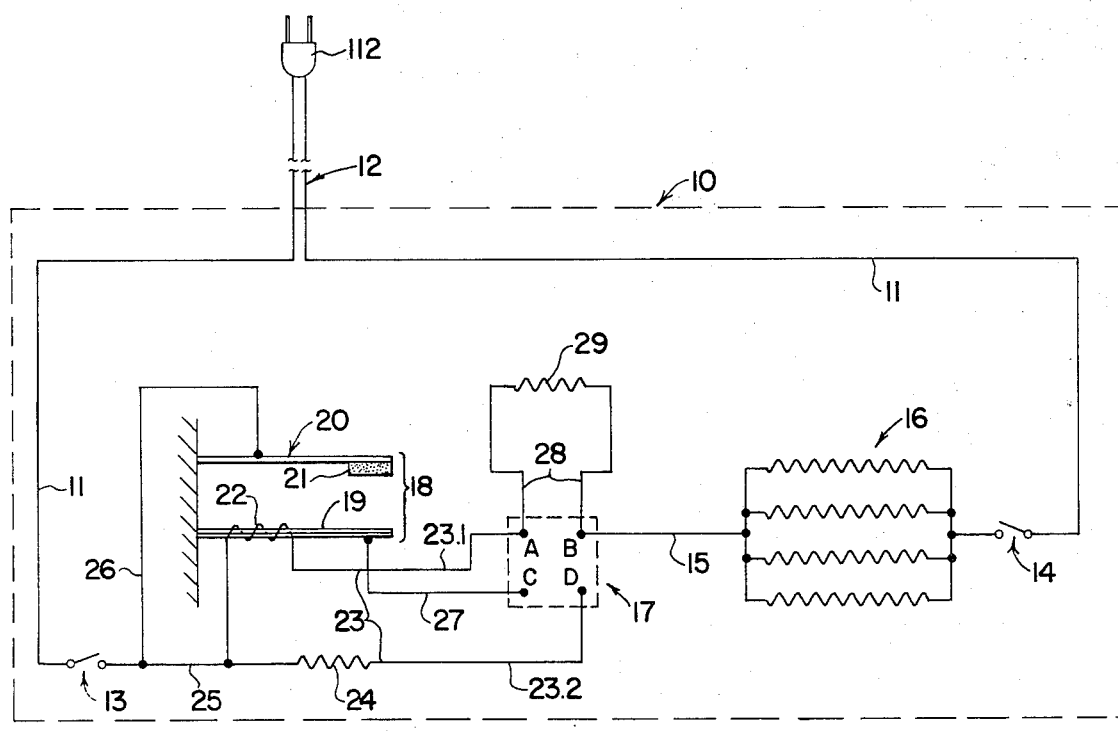

3,819,904

CONTROL CIRCUIT FOR TIMED FOOD HEATING DEVICE

BACKGROUND AND SUMMARY OF THE INVENTION

The present invention relates to timed food heating devices, more particularly but not limited to electric toasters, and the principal object of the invention is to provide new and improved devices of the character described.

In the common electric toaster, radiant heating elements are energized at full wattage for a variable length of time selected by the user to control the degree of browning desired.

Normally, this time variation by the user produces satisfactory results; however, there are circumstances when food is merely to be warmed without toasting and it would be desirable to reduce the wattage of the heating elements to a level where they will heat but not appreciably brown the food. This is easily accomplished in the present invention merely by actuating a selector switch. It has also been found desirable to first warm the food by operating the heating elements at low wattage for a time and to then operate the elements at high wattage to brown the food surface. This will more thoroughly warm the interior of the food while not exceeding the brownness desired and this too is accomplished merely by actuation of the selector switch.

It has long been known to reduce the wattage of the heating elements of a toaster by disposing a dropping resistor or rectifier selectively in series with the elements. In practice, however, this expedient has been unsatisfactory where the usual heat-up, cool-down thermal timer is employed to control the toaster due to the fact that the reduction in wattage of the main heating elements also reduces the wattage of the timer heater. In many cases, such timer heater would not operate properly, if at all, under such low wattage conditions.

The present invention contemplates use of a timer heater chosen to provide the necessary heat to operate the timer under reduced wattage operation of the main heating elements. This would normally cause the timer heater to generate far too much heat during full wattage operation of the main heating elements; however, during such full wattage operation of the main heating elements, sufficient current is shunted around the timer heater to maintain its heat output at the proper level. The present invention makes possible a highly flexible toaster device of little more complexity than the ordinary toaster and at little increase in manufacturing cost compared to the greatly increased flexibility of operation obtained.

These and other features and advantages will readily become apparent from a study of the following description and from the drawing appended hereto, and in this drawing:

DRAWING DESCRIPTION

FIG. 1 is a schematic diagram of an electric circuit for a toaster illustrating a preferred form of the present invention.

DETAILED DESCRIPTION

For a complete understanding of the present invention, it may be helpful to refer to U.S. Letters Pat. No. 2,778,902 which is hereby incorporated by reference herein. This patent discloses a type of heat-up, cool-down timer which is employed with the present invention.

In brief, such a timer comprises a bimetallic blade which is adapted to be heated by one or more turns of a heater wire wrapped therearound when the bread carriage of the toaster is depressed. As the bimetal is heated by energization of the bimetal heater, the bimetal warps until a magnetically permeable portion thereof is attracted to a permanent magnet carried by a spring blade. Upon engagement of the bimetal portion with the magnet, a shunt circuit is established about the bimetal heater and this causes the bimetal to cool and warp toward its starting position. Upon sufficient cooling of the bimetal, the magnet will be stripped from the bimetal; however, the release of the magnet will cause the spring arm to terminate the cycle of operation of the toaster to await the initiation of another cycle of operation by the user.

With reference now to the drawing, the toaster housing is represented by the lines 10 and encloses the usual operating parts as well as about-to-be-described circuits and components. Within the housing 10 is a main circuit 11 which terminates externally of the housing in the usual flexible power cord 12 and plug 112. Circuit 11 terminates within the housing at respective line switches 13 and 14 of any conventional design. Although not shown, the normally open line switches 13 and 14 are adapted to be closed in the usual manner, as by lowering of the toaster bread carriage at the commencement of a toasting cycle. Such switches, it will be understood, will remain closed until a toasting cycle is completed and the lowered bread carriage is elevated to project the toast from its receiving slot.

Extending from the switch 14 is a circuit 15 which includes the usual bread toasting heating elements. As herein disclosed, four elements 16 are arranged in parallel; however, it will be appreciated that the number and arrangement of such elements, hereinafter to be referred to as the main heater or heaters, forms no part of the present invention and thus may take any convenient form. Circuit 15 terminates a contact B of a suitable selector switch 17 having a conventional actuator (not shown) projecting outwardly of the housing for convenient adjustment by the user.

The reference character 18 indicates a heat-up, cool-down timer of the general type disclosed in the patent above mentioned and includes a bimetal blade 19 adjacent a spring blade 20 mounting a permanent magnet 21. Wrapped about but electrically insulated from bimetal 19 is one or more turns of a heater wire which forms a timer heater 22. While such timer heater is disclosed as being wrapped about the bimetal blade 19, it will readily be appreciated that such heater could be arranged in any suitable manner whereby the heat generated thereby upon energization thereof will heat the bimetal to cause deflection thereof. Timer heater 22 is in a circuit 23 having branches 23.1, 23.2 whose ends terminate at contacts A and D respectively of the selector switch 17.

Also in circuit 23 is a resistor 24 which may be mounted in any convenient location within the toaster housing where the relatively small amount of heat generated thereby upon energization may be harmlessly dissipated. Extending from circuit 23 between timer heater 22 and resistor 24 is a circuit 25 which terminates at line switch 13. Extending between the spring blade 20 and the circuit 25 is a circuit 26 and extending between the bimetal blade 19 and contact C of switch 17 is a circuit 27.

Extending between contacts A and B of selector switch 17 via a circuit 28 is a dropping resistor 29 of any suitable form. While it forms no part of the present invention, resistor 29 presently comprises a helical resistor conductor enclosed in a ceramic body, the latter being mounted on the base of the toaster beneath the two center heating elements of the four main heaters. In this location, the heat generated by resistor 29 is discharged into the bread toasting chambers of the toaster and thus supplements that generated by the main heaters; however, it will be appreciated that such resistor could be located wherever its heat can be dissipated without harm.

With a toaster having the described circuitry connected to a suitable source of electrical energy, the heaters 16 and 22 and the resistors 24 and 29 preferably have the following approximate electrical relationship with each other.

With the main heaters 16 energized in series with both the dropping resistor 29 and the bimetal heater 22, the main heaters will develop about 520 watts while the dropping resistor will develop about 195 watts. This represents a total of approximately 715 watts discharged into the bread toasting chambers and is adequate to dry out or bake the bread without appreciably browning the same. At the same time, the bimetal heater will develop about 30 watts to actuate the timer 18 over a suitable time cycle.

With the main heaters 16 energized in series with the bimetal heater 22, the main heaters will develop about 990 watts to provide normal toast by browning the exterior of the bread slices without excessively drying out the interior of the slices. Under such circumstances, however, the bimetal heater would develop such high wattage that the timer 18 would operate too quickly and thus the operational cycle would be too short for the desired results. For this reason and as will later appear, the resistor 24 will be disposed in shunt about the bimetal heater 22 and will be so chosen to limit the wattage of the latter to about 35 watts.

Operation of the disclosed circuit during a cycle for making normal toast will be as follows: With plug 112 inserted into a socket at which normal household electrical energy is available, bread (or other food) to be toasted will be inserted into the usual toaster housing slots to rest upon the usual bread carriage where the bread is partially projected from the housing. Selector switch 17 will be adjusted by the user to a position wherein contacts A, B, C and D are all electrically interconnected and the usual browning control adjusted to the desired position for the degree of toasting desired. The previously mentioned carriage may now be lowered by the user to cause descent of the bread slices into the toaster housing.

With the bread carriage lowered, it will be latched in position as disclosed in the previously mentioned patent and the line switches 13 and 14 closed. Electrical energy will flow through the main heater 16 and through the bimetal heater 22 via circuit 15, bridged switch contacts A, B, C and D, branch circuit 23.1 and circuit 25. Current will also flow through shunt resistor 24 via branch circuit 23.2, thus limiting the wattage of heater 22 as before described. It will be noted that at this time, dropping resistor 29 is not in circuit since switch contacts A and B are joined.

With bimetal heater 22 energized, the heat generated thereby will cause the bimetal 19 to warp toward the spring blade 20 to eventually approach closely enough for the magnet 21 to be attracted to the bimetal. Upon engagement of the magnet and bimetal, a shunt path about both the bimetal heater and the shunt resistor will be provided via the circuits 25, 26 and 27 and the spring blade 20, the magnet 21 and the bimetal 19. With such shunt path established, the bimetal heater will be deenergized to allow the bimetal to cool. As the bimetal cools, it will warp away from the spring blade 20; however, contact therebetween will not immediately be lost because of the resiliency of the spring blade and the attraction of the bimetal by the magnet. Eventually, as disclosed in the patent aforesaid, the magnet will be stripped from the bimetal to spring to its starting position and in so doing, the spring blade will release the bread carriage for return to its upper position wherein line switches 13 and 24 are open and the toast is partially projected from the toaster housing slots for easy removal by the user.

When it is desired to dry or bake the bread slices or other food throughout but without substantial browning of the exterior, the selector switch 17 will be adjusted by the user to join only the contacts A and C. Now, when the carriage is lowered to close the line switches 13 and 14, electrical energy will flow through the main heaters 16, the dropping resistor 29 and the bimetal heater 22 via circuits 15, 28, branch circuit 23.1 and circuit 25. With the resistor 29 in series with the main heaters, the total wattage developed by both the main heaters and the dropping resistor will be about 715 watts. Since the bimetal heater 22 is also in series with the main heater and dropping resistor, the wattage developed by the bimetal heater would be drastically reduced; however, the shunt resistor 24 is at this time out of the circuit and thus the wattage of heater 22 is at this time about 30 watts rather than the 35 watts during normal toasting.

With the bimetal heater energized at 30 watts, the bimetal 19 will be heated as before but at a slightly lower rate to prolong the time interval required to warp the bimetal to engagement with the spring blade magnet 21. Upon engagement of the bimetal with the magnet, the bimetal heater will be shunted out as before to thus allow the bimetal to cool and warp toward its starting position. As previously described, when the bimetal has cooled sufficiently, the spring blade will snap to its starting position to terminate the operational cycle. It is to be noted that during both the heat-up and the cool-down portions of operation of the timer 18, the dropping resistor 29 will be in series with the main heaters to reduce the wattage of the latter.

When it is desired to first dry the bread slices and then brown the exterior thereof, the selector switch 17 will be adjusted by the user to join only the switch contacts B and C. Upon lowering of the bread carriage, electrical energy will flow across the closed line switches 13, 14 and through the main heaters 16, the dropping resistor 29 and the bimetal heater 22 via the circuits 15, 28, 23.1 and 25, all as hereinabove described with respect to the drying or baking operation.

When, however, bimetal 19 has warped sufficiently to engage the spring blade magnet 21, a shunt path will be established about both the dropping resistor 29 and the bimetal heater 22 via the joined switch contacts B and C, circuits 25, 26 and 27, and the spring blade 20, magnet 21 and bimetal 19. Such shunt path, it will be seen, will cause energization of the main heaters 16 at full wattage until such time as the bimetal has cooled sufficiently to terminate the operational cycle in the manner previously described.

While reference has been made herein to "bread slices" or "toast", it is to be understood that such terms are to be considered as broadly including other articles of food which may be inserted into a toaster chamber for warming and/or browning.

In view of the foregoing, it will be apparent to those skilled in the art that I have accomplished at least the principal object of my invention and it will also be apparent to those skilled in the art that the embodiment herein described may be variously changed and modified without departing from the spirit of the invention, and that the invention is capable of uses and has advantages not herein specifically described, hence it will be appreciated that the hereindisclosed embodiment is illustrative only and that my invention is not limited thereto.

I claim:

1. In a timed food heating device having a main heater connectable to a source of electrical energy and a timer for controlling energization of said main heater through an operational cycle, said timer including a heat-responsive member as well as a timer heater and the latter being adapted to heat said member when energized from said source, the improvement comprising first means for selective connection in and disconnection from circuit with said main heater to vary the heat output thereof,
second means for selective connection in and disconnection from circuit with said timer heater to vary heat output to said heat-responsive timer member, and switch means selectively connecting and disconnecting said first means from circuit with said main heater and also selectively connecting and disconnecting said second means from circuit with said timer heater.

2. The construction of claim 1 wherein an operational cycle of said timer includes an initial heat-up phase during which said timer heater is energized to heat said heat-reponsive member and a subsequent cool-down phase during which said timer heater is de-energized to permit cooling of said heat-responsive member,
wherein said switch means has one position in which said first means is connected in circuit with said main heater during both the heat-up and cool-down phases of operation of said timer,
wherein said switch means has another position in which said first means is disconnected from circuit with said main heater during both the heat-up and cool-down phases of operation of said timer,
and wherein said switch means has still another position in which said first means is connected in circuit with said main heater during the heat-up phase of operation of said timer and is disconnected from circuit with said main heater during the cool-down phase of operation of said timer.

3. The construction of claim 2 wherein said first means comprises a first resistance selectively connectable in series with said main heater to reduce the heat output of the latter,
and wherein said second means comprises a second resistance selectively connectable in shunt with said timer heater to reduce the heat output of the latter.

4. The construction of claim 1 wherein said first and second means function reduce the heat output of said main and timer heaters respectively when in circuit therewith,
wherein said switch means has one position in which said first means is connected in circuit with said main heater and said second means is disconnected from circuit with said timer heater,
and wherein said switch means has another position in which said first means is disconnected from circuit with said main heater and said second means is connected in circuit with said timer heater.

5. The construction of claim 4 wherein said first means comprises a first resistance selectively connectable in series with said main heater,
and wherein said second means comprises a second resistance selectively connectable in shunt with said timer heater.

6. The construction of claim 5 wherein said switch means is in shunt relation with said first resistance and is in series relation with said second resistance.

7. The construction of claim 1 wherein an operational cycle of said timer includes an initial heat-up phase during which said timer heater is energized to heat said heat-reponsive member and a subsequent cool-down phase during which said timer heater is de-energized to permit cooling of said heat-responsive member,
wherein said switch means has one position in which said first means is connected in circuit with said main heater during both the heat-up and cool-down phases of operation of said timer while said second means is disconnected from circuit with said timer heater during both aforesaid phases of operation of said timer,
wherein said switch means has another position in which said first means is disconnected from circuit with said main heater during both the heat-up and cool-down phases of operation of said timer while said second means is connected in circuit with said timer heater during both aforesaid phases of operation of said timer,
and wherein said swich means has still another position in which said second means is disconnected from circuit with said timer heater while said first means is connected in circuit with said main heater during the heat-up phase of operation of said timer and said first means is disconnected from circuit with said main heater during the cool-down phase of operation of said timer.

8. The construction of claim 7 wherein said first means is selectively connectable in series with said main heater,
wherein said second means is selectively connectable in shunt with said timer heater,
and wherein said switch means is in shunt relation with said first means and in series relation with said second means to effect connection and disconnection aforesaid of said first and second means with said main and timer heaters respectively.

9. The construction of claim 8 wherein said first and second means are resistances.

* * * * *